United States Patent
Nakamura et al.

(10) Patent No.: US 11,608,106 B2
(45) Date of Patent: Mar. 21, 2023

(54) STEERING SYSTEM (71) Applicant: JTEKT CORPORATION, Osaka (JP)

(72) Inventors: Keishi Nakamura, Okazaki (JP); Yoshio Kondo, Okazaki (JP); Toshiaki Ogata, Okazaki (JP); Fumio Kishida, Toyota (JP)

(73) Assignee: JTEKT CORPORATION, Osaka (JP)

( * ) Notice: Subject to any disclaimer, the term of this patent is extended or adjusted under 35 U.S.C. 154(b) by 367 days.

(21) Appl. No.: 16/861,360

(22) Filed: Apr. 29, 2020

(65) Prior Publication Data
US 2020/0361523 A1 Nov. 19, 2020

(30) Foreign Application Priority Data
May 15, 2019 (JP) .............................. JP2019-092359

(51) Int. Cl.
*B62D 5/04* (2006.01)
*B62D 15/02* (2006.01)

(52) U.S. Cl.
CPC .......... *B62D 5/0445* (2013.01); *B62D 5/046* (2013.01); *B62D 15/0235* (2013.01)

(58) Field of Classification Search
CPC ... B62D 5/0445; B62D 5/046; B62D 15/0235
USPC ........................................................ 180/444
See application file for complete search history.

(56) References Cited

U.S. PATENT DOCUMENTS

| | | | | |
|---|---|---|---|---|
| 2003/0046012 A1* | 3/2003 | Yamaguchi | ......... | G01D 5/2086 180/405 |
| 2006/0042411 A1* | 3/2006 | Abele | ............... | B62D 15/0225 74/29 |
| 2006/0278466 A1* | 12/2006 | Cheng | .................... | B62D 5/046 180/444 |
| 2017/0282965 A1* | 10/2017 | Sekikawa | ............ | B62D 5/0448 |

FOREIGN PATENT DOCUMENTS

| | | |
|---|---|---|
| DE | 10 2007 011 672 A1 | 6/2008 |
| DE | 10 2017 106 671 A1 | 10/2018 |
| EP | 1 632 421 A2 | 3/2006 |
| EP | 3 225 509 A1 | 10/2017 |
| JP | 2006-347208 A | 12/2006 |
| JP | 2010-214978 A | 9/2010 |
| WO | 2006/138209 A2 | 12/2006 |

OTHER PUBLICATIONS

Oct. 13, 2020 Extended Search Report issued in European Patent Application No. 20174170.9.

* cited by examiner

*Primary Examiner* — Mahmoud S Ismail
(74) *Attorney, Agent, or Firm* — Oliff PLC (57) ABSTRACT

A steering system includes a housing, a steering operation shaft that is housed in the housing and configured to move in an axial direction to steer right and left steered wheels, a first drive source that generates a first drive force, a second drive source that generates a second drive force, a first power transfer unit that applies an axial force to the steering operation shaft with the first drive source, a second power transfer unit that applies an axial force to the steering

(Continued)

operation shaft with the second drive force, a position detection sensor that is provided in the housing and detects an axial position of the steering operation shaft, and a control device that controls the first drive source and the second drive source using a detection result of the position detection sensor.

8 Claims, 5 Drawing Sheets

STEERING SYSTEM

CROSS-REFERENCE TO RELATED APPLICATION

This application claims priority to Japanese Patent Application No. 2019-092359 filed on May 15, 2019, incorporated herein by reference in its entirety.

BACKGROUND

1. Technical Field

The disclosure relates to a steering system.

2. Description of Related Art

Conventionally, there is a known steer-by-wire steering system in which a steering wheel operated by a driver and a steering operation shaft that steers right and left steered wheels are not mechanically coupled. In such a steering system, a steering gear ratio that is a ratio of a steered amount of the steered wheels with respect to an operation amount of the steering wheel can be varied based on vehicle state information such as a vehicle speed sensor and a detected value of an acceleration sensor. For example, at the time of parking a vehicle, the steering gear ratio is increased to reduce the operation amount of the steering wheel, thereby reducing a burden on a driver.

A steer-by-wire steering system described in Japanese Unexamined Patent Application Publication No. 2010-214978 (JP 2010-214978 A) includes: a steering wheel that is operated by a driver; a steering angle sensor that detects a steering angle of the steering wheel; a pair of right and left steering operation motors; a left steering shaft that steers a left wheel; a left output transfer mechanism that transfers output of the left steering operation motor to the left steering shaft; a right steering shaft that steers the right wheel; and right output transfer mechanism that transfers output of the right steering operation motor to the right steering shaft. The right and left output transfer mechanisms each include a ball screw shaft portion of the steering shaft, a ball nut that is engaged with the ball screw shaft portion via a plurality of balls, an output gear provided on an output shaft of the steering operation motor, and an input gear fixed to an outer peripheral surface of the ball nut and meshing with the output gear. The right and left steering operation motors are each controlled by a steering control unit of an electrical control unit based on the steering angle detected by the steering angle sensor.

SUMMARY

In the steer-by-wire steering system described in JP 2010-214978 A, the steering control unit can estimate steered angles of the steered wheels based on detected values of rotation angle detection devices such as encoders provided in the steering operation motors, so as to control the steering operation motors based on the estimated value, thereby adjusting the steering gear ratio. However, the output gear, the input gear, the ball nut, and the balls are interposed between the output shaft of each steering operation motor and each of the right and left steering shafts. Thus, steered angle estimation accuracy decreases due to backlash etc. caused by clearances (looseness) among the output gear, the input gear, the ball nut, and the balls. In particular, if there is an error in the estimated value of the steered angle when the steering angle of the steering wheel is zero and the vehicle is traveling straight, an adverse effect may occur on straight line vehicle stability.

Thus, the disclosure provides a steering system that can increase steered angle estimation accuracy.

A steering system according to an aspect of the disclosure includes: a housing having a hollow shape; a steering operation shaft that is housed in the housing, the steering operation shaft having a first external thread groove that is one of a left-hand thread groove and a right-hand thread groove, the steering operation shaft having a second external thread groove that is the other one of the left-hand thread groove and the right-hand thread groove, and the steering operation shaft configured to move in an axial direction of the steering operation shaft to steer right and left steered wheels; a first nut screwed with the first external thread groove and rotatably supported inside the housing; a second nut screwed with the second external thread groove and rotatably supported inside the housing; a first drive source that generates a first drive force; a second drive source that operates independently of the first drive source to generate a second drive force; a first power transfer unit that transfers the first drive force to the first nut and rotates the first nut to apply an axial force to the steering operation shaft; a second power transfer unit that transfers the second drive force to the second nut and rotates the second nut to apply an axial force to the steering operation shaft; a position detection sensor that is provided in the housing and that detects an axial position of the steering operation shaft; and a control device that controls the first drive source and the second drive source using a detection result of the position detection sensor.

With the steering system of the aspect, it is possible to increase steered angle estimation accuracy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENT

First Embodiment

A first embodiment of the disclosure will be described with reference to the accompanying drawings. Embodiments described below are represented as specific examples suitable for carrying out the disclosure. Although some parts exemplify various technical matters that are technically preferable, the technical scope of the disclosure is not limited to the specific examples.

Figure 1:
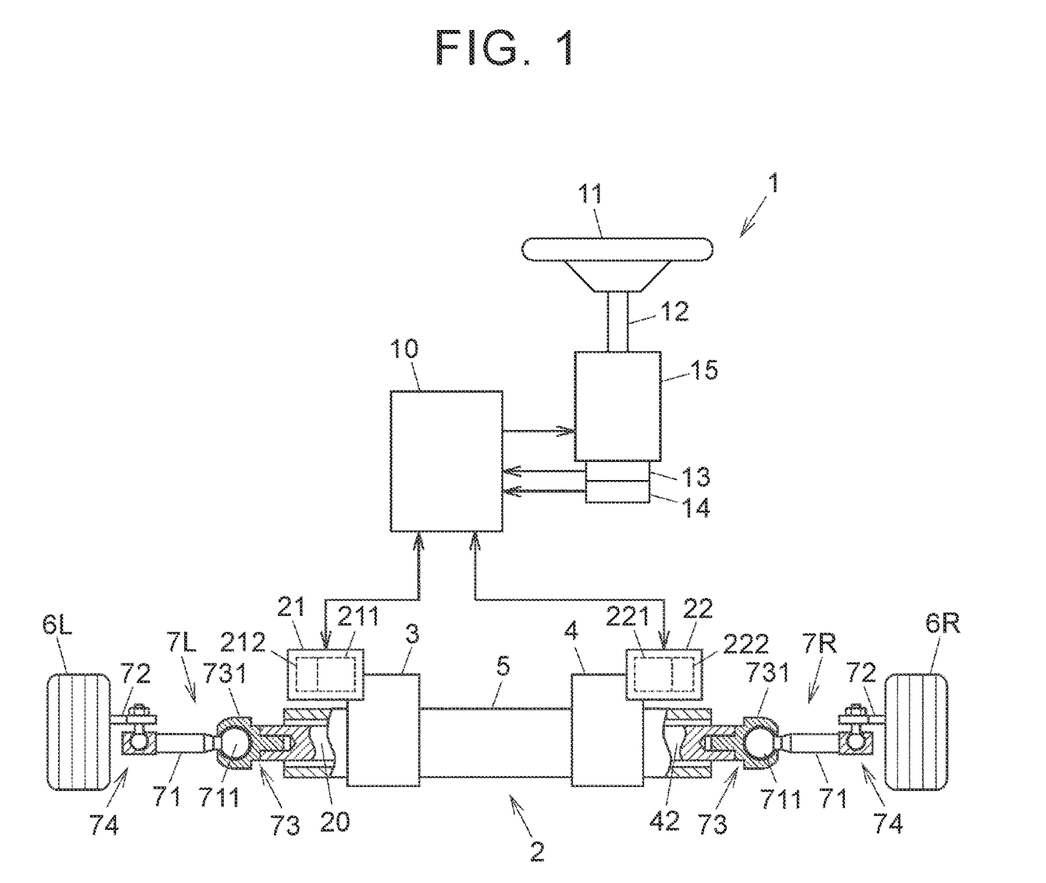
FIG. 1 is a schematic diagram showing an example of a schematic configuration of a steering system according to a first embodiment of the disclosure.

FIG. 1 is a schematic diagram showing an example of a schematic configuration of a steer-by-wire steering system according to a first embodiment of the disclosure. In the following description, terms "right" and "left" refer to right and left sides in a width direction of a vehicle in which the steering system is mounted.

The steering system 1 includes a steering wheel 11, a steering shaft 12, a steering angle sensor 13, a torque sensor 14, a reaction actuator 15, a steering operation device 2, and a control device 10. The steering wheel 11 serves as a steering member operated by a driver. The steering shaft 12 rotates together with the steering wheel 11. The steering angle sensor 13 detects a steering angle of the steering wheel 11. The torque sensor 14 detects a steering torque applied to the steering wheel 11. The reaction actuator 15 applies steering reaction force to the steering shaft 12. The steering operation device 2 steers right and left front wheels 6R, 6L, which are steered wheels, via right and left link mechanisms 7R, 7L. The control device 10 controls the reaction actuator 15 and the steering operation device 2.

In the steering system 1, the steering operation device 2 steers the right and left front wheels 6R, 6L in response to operation of the steering wheel 11. The control device 10 controls the reaction actuator 15 and the steering operation device 2, based on the steering angle and the steering torque detected by the steering angle sensor 13 and the torque sensor 14, vehicle state information such as detected values detected by acceleration sensors that detect accelerations in a lateral direction and a front-rear direction, a vehicle speed, and the like.

The right and left link mechanisms 7R, 7L each have a tie rod 71, a knuckle arm 72, and first and second ball joints 73, 74. In the left link mechanism 7L, a first end of the tie rod 71 is swingably coupled to a left end portion of a rack shaft 20 of the steering operation device 2, described later, with the first ball joint 73, and a second end of the tie rod 71 is swingably coupled, with the second ball joint 74, to the knuckle arm 72 that changes a direction of the left front wheel 6L.

In the right link mechanism 7R, a first end of the tie rod 71 is swingably coupled to a right end portion of a rack shaft 20 with the first ball joint 73, and a second end of the tie rod 71 is swingably coupled, with the second ball joint 74, to the knuckle arm 72 that changes a direction of the right front wheel 6R. The first ball joints 73 of the right and left link mechanisms 7R, 7L are each configured such that a ball portion 711 provided at the first end of the tie rod 71 is housed in a ball joint socket 731.

The steering operation device 2 includes the rack shaft 20, first and second moving mechanisms 3, 4, a first electric motor 21, a second electric motor 22, and a housing 5. The rack shaft 20 serves as a steering operation shaft that moves in an axial direction along the vehicle width direction so as to steer the right and left front wheels 6R, 6L. The first and second moving mechanisms 3, 4 are independent of each other. The first electric motor 21 actuates the first moving mechanism 3. The second electric motor 22 actuates the second moving mechanism 4. The housing 5 has a hollow shape and houses the rack shaft 20. The first and second moving mechanisms 3, 4 move the rack shaft 20 in the axial direction with respect to the housing 5.

The first and second electric motors 21, 22 are controlled by the control device 10. The first and second electric motors 21, 22 are, for example, three-phase motors. The first electric motor 21 includes a drive unit 211 composed of a stator and a rotor, and a rotation angle detection device 212 for detecting a rotation angle of the rotor with respect to the stator. The second electric motor 22 includes a drive unit 221 composed of a stator and a rotor, and a rotation angle detection device 222 for detecting a rotation angle of the rotor with respect to the stator. The control device 10 acquires detection signals of the rotation angle detection devices 212, 222, and controls the first and second electric motors 21, 22 such that detected values of the rotation angle match command values.

The housing 5 is fixed to a vehicle body, and both end portions of the rack shaft 20 project from the housing 5 in a right-left direction. The ball joint sockets 731 have a larger diameter than the rack shaft 20. An amount of movement of the rack shaft 20 in the axial direction relative to the housing 5 is limited by abutment of the ball joint socket 731 with the end portion of the housing 5.

Figure 2:
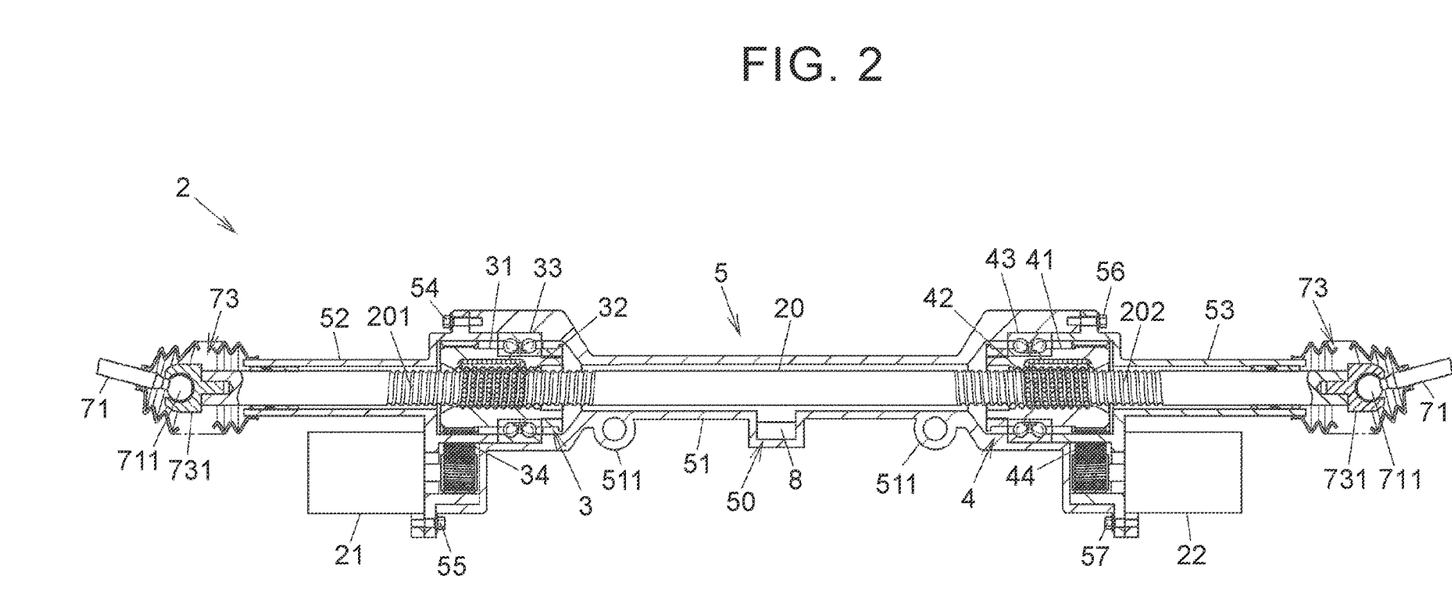
FIG. 2 is a sectional view showing a configuration of a steering operation device.
Figure 3:
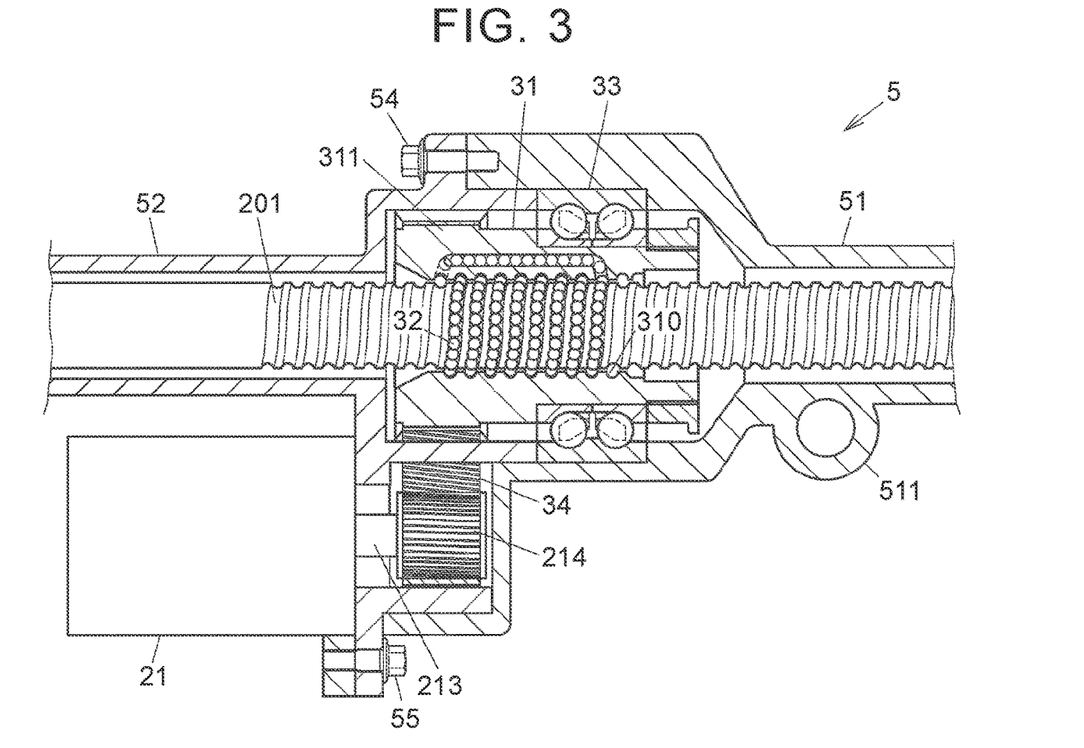
FIG. 3 is a partial enlarged view of FIG. 2, showing a first moving mechanism and its periphery.

FIG. 2 is a sectional view showing the configuration of the steering operation device 2. FIG. 3 is a partial enlarged view of FIG. 2, showing the first moving mechanism 3 and its periphery.

The first moving mechanism 3 has a first ball screw nut 31, a plurality of balls 32, a bearing 33, and a belt 34. The first ball screw nut 31 is rotated by the first electric motor 21. The balls 32 circulate and roll between the first ball screw nut 31 and the rack shaft 20. The bearing 33 supports the first ball screw nut 31 such that the first ball screw nut 31 is rotatable relative to the housing 5. The belt 34 transfers a rotational force of the first electric motor 21 to the first ball screw nut 31.

Similarly, the second moving mechanism 4 has a second ball screw nut 41, a plurality of balls 42, a bearing 43, and a belt 44. The second ball screw nut 41 is rotated by the second electric motor 22. The balls 42 circulate and roll between the second ball screw nut 41 and the rack shaft 20. The bearing 43 supports the second ball screw nut 41 such that the second ball screw nut 41 is rotatable relative to the housing 5. The belt 44 transfers a rotational force of the second electric motor 22 to the second ball screw nut 41. The first ball screw nut 31 and the second ball screw nut 41 are rotatably supported inside the housing 5.

As shown in FIG. 3 in an enlarged manner, an inner peripheral surface of the first ball screw nut 31 has a helical rolling groove 310, on which the balls 32 roll. An outer peripheral surface of the rack shaft 20 has a helical first rolling groove 201. The balls 32 roll between the first ball screw nut 31 and the first rolling groove 201. An outer peripheral surface of the first ball screw nut 31 has a plurality of meshing teeth 311 that mesh with the belt 34. The belt 34 is wound around a pulley 214 fixed to the motor shaft 213 of the first electric motor 21 and the first ball screw nut 31, and reduces the rotational force output from the first electric motor 21, and transfers the resultant rotational force to the first ball screw nut 31.

The second moving mechanism 4 is configured the same as the first moving mechanism 3, but constituent members thereof are disposed symmetrically with those of the first moving mechanism 3. The outer peripheral surface of the rack shaft 20 has a helical second rolling groove 202. The balls 42 roll between the second ball screw nut 41 and the second rolling groove 202. The first rolling groove 201 and the second rolling groove 202 of the rack shaft 20 are external thread grooves and helical directions thereof are opposite to each other. Thus, the first and second rolling grooves 201, 202 have opposite thread orientation.

That is, the rack shaft 20 has the first rolling groove 201 serving as a first external thread groove that is one of a left-hand thread groove and a right-hand thread groove, and has the second rolling groove 202 serving as a second external thread groove that is the other one of the left-hand thread groove and the right-hand thread groove. The rack shaft 20 moves in the axial direction so as to steer the right and left front wheels 6R, 6L. The first ball screw nut 31 is screwed with the first rolling groove 201 via the balls 32, and the second ball screw nut 41 is screwed with the second rolling groove 202 via the balls 42.

The first electric motor 21 is a first drive source that generates a first drive force for rotating the first ball screw nut 31, and the second electric motor 22 is a second drive source that generates a second drive force for rotating the second ball screw nut 41. The first electric motor 21 and the second electric motor 22 can operate independently of each other. The belt 34 of the first moving mechanism 3 serves as a first power transfer unit that transfers the first drive force to the first ball screw nut 31 and rotates the first ball screw nut 31 to apply an axial force to the rack shaft 20. The belt 44 of the second moving mechanism 4 serves as a second power transfer unit that transfers the second drive force to the second ball screw nut 41 and rotates the second ball screw nut 41 to apply an axial force to the rack shaft 20.

The first electric motor 21 and the second electric motor 22 are configured to transfer the first drive force and the second drive force to the rack shaft 20 via the belts 34, 44 so as to cooperatively move the rack shaft 20.

The housing 5 is formed by fastening the first to third housing members 51 to 53 together with bolts. The first housing member 51 mainly houses the first and second ball screw nuts 31, 41, and a portion of the rack shaft 20 between the first and second ball screw nuts 31, 41. The second housing member 52 mainly houses a portion of the rack shaft 20 on a left side of the first ball screw nut 31. The third housing member 53 mainly houses a portion of the rack shaft 20 on a right side of the second ball screw nut 41.

The second housing member 52 is fixed to a left end portion of the first housing member 51 with a plurality of bolts 54, and the first electric motor 21 is also fixed to the left end portion of the first housing member 51 with a plurality of bolts 55. The third housing member 53 is fixed to a right end portion of the first housing member 51 with a plurality of bolts 56, and the second electric motor 22 is also fixed to the right end portion of the first housing member 51 with a plurality of bolts 57. FIG. 2 shows one of the respective bolts 55 to 57. The first housing member 51 is provided with a plurality of attachment portions 511 for attachment to the vehicle body.

The position detection sensor 8 for detecting an axial position of the rack shaft 20 is attached to the housing 5. In the present embodiment, an accommodating portion 50 for accommodating the position detection sensor 8 is provided at a center portion of the first housing member 51. However, the attachment position of the position detection sensor 8 is not limited thereto, and the position detection sensor 8 only needs to be fixed at a position at which the position detection sensor 8 faces a portion of the outer peripheral surface of the rack shaft 20, in which the first and second rolling grooves 201, 202 are not provided.

The position detection sensor 8 reads marks (described later) on the rack shaft 20 to detect the axial position of the rack shaft 20, and outputs the detection signal to the control device 10. The control device 10 controls the first and second electric motors 21, 22 using the detection result of the position detection sensor 8.

Figure 4:
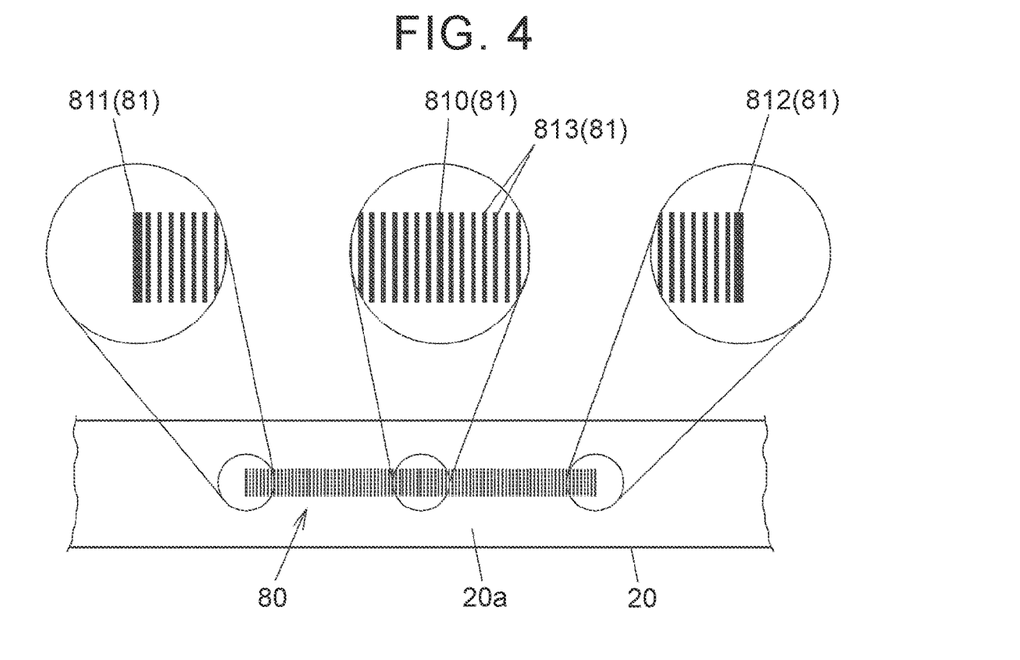
FIG. 4 is an explanatory diagram showing an example of a read portion that is composed of a plurality of marks on a rack shaft.

FIG. 4 is an explanatory diagram showing an example of a read portion 80 that is composed of a plurality of marks 81 on the rack shaft 20. In the present embodiment, each of the marks 81 is formed of a straight line extending in a circumferential direction of the outer peripheral surface 20a of the rack shaft 20. In the present embodiment, each mark 81 is formed by spraying or transferring a color paint. However, the mark 81 may be formed by attaching a sheet-like label, for example. The mark 81 may be formed by making a cut or a dent in the outer peripheral surface 20a of the rack shaft 20.

The marks 81 include a neutral position mark 810, first and second rack end position marks 811, 812, and a plurality of tick marks 813. The neutral position mark 810 indicates a neutral position at which the rack shaft 20 is positioned when the vehicle travels straight with the steered angle of the right and left front wheels 6R, 6L being zero. The first and second rack end position marks 811, 812 are provided at right and left end portions of the read portion 80. The tick marks 813 are provided at equal intervals between the neutral position mark 810 and the first rack end position mark 811 and between the neutral position mark 810 and the second rack end position mark 812. The marks 81 represent a general term for the neutral position mark 810, the first and second rack end position marks 811, 812, and the tick marks 813.

The neutral position mark 810 and the first and second rack end position marks 811, 812 are thick lines that are thicker than the tick marks 813. In addition, the thickness of the neutral position mark 810 and the thickness of the first and second rack end position marks 811, 812 are different from each other, and the thickness of the first and second rack end position marks 811, 812 is thicker than the thickness of the neutral position mark 810 in the example illustrated in FIG. 4. In the example illustrated in FIG. 4, the thicknesses of the first and second rack end position marks 811, 812 are the same, but they may be different from each other.

The first rack end position mark 811 is provided at such a position as to be read by the position detection sensor 8 when the rack shaft 20 is positioned around a large movement position (rack end position) in the rightward direction at which the ball joint socket 731 of the left link mechanism 7L abuts against the right end portion of the housing 5. The second rack end position mark 812 is provided at such a position as to be read by the position detection sensor 8 when the rack shaft 20 is positioned around a large movement position (rack end position) in the leftward direction at which the ball joint socket 731 of the right link mechanism 7R abuts against the left end portion of the housing 5.

The position detection sensor 8 emits reading light toward the read portion 80 and receives reflection light reflected from the read portion 80 to read the marks 81. A signal indicating the result of the reading is output to the control device 10 as a detection signal of the position of the rack shaft 20. The operation to read the marks 81 is repeatedly performed at minute time intervals.

The position detection sensor 8 can read, at a time, a range that is larger than at least the thicknesses of the neutral position mark 810 and the first and second rack end position marks 811, 812, and can detect the thicknesses of the marks 81. The detection signal that is output to the control device 10 includes information on the thicknesses of the lines of the marks 81. The reading light may be visible light, or may be, for example, a non-visible light such as infrared rays.

The control device 10 can detect the neutral position of the rack shaft 20 based on the detection signal output from the position detection sensor 8. By counting the tick marks 813 that pass through a reading range of the position detection sensor 8 after detecting the neutral position, the control device 10 can obtain the axial position of the rack shaft 20 relative to the housing 5. The control device 10 can estimate the steered angles of the front wheels 6R, 6L based on the axial position of the rack shaft 20.

The control device 10 controls the first and second electric motors 21, 22 such that the steered angles of the front wheels 6R, 6L have values taking into consideration the steering gear ratio that is detected by the steering angle sensor 13. A suitable value is set for the steering gear ratio based on a yaw rate, detected values of acceleration sensors in various directions such as the vehicle front-rear direction and the lateral direction, and the vehicle state information such as the vehicle speed and the steering angle.

Operation and Effects of First Embodiment

According to the first embodiment of the disclosure described above, it is possible to detect the axial position of the rack shaft 20 based on the detection signal from the position detection sensor 8 that is attached to the housing 5, and thus, it is possible to estimate the steered angle of the front wheels 6L, 6R based on the axial position of the rack shaft 20. Thus, for example, compared with a case where the steered angles of the front wheels 6L, 6R are estimated based on only the detection signals from the rotation angle detection devices 212, 222 of the first and second electric motors 21 and 22, the steered angles of the front wheels 6L, 6R can be more accurately estimated.

Modification of Read Portion 80

Next, a modification of the read portion 80 will be described with reference to FIGS. 5A to 5C.

Figure 5A:
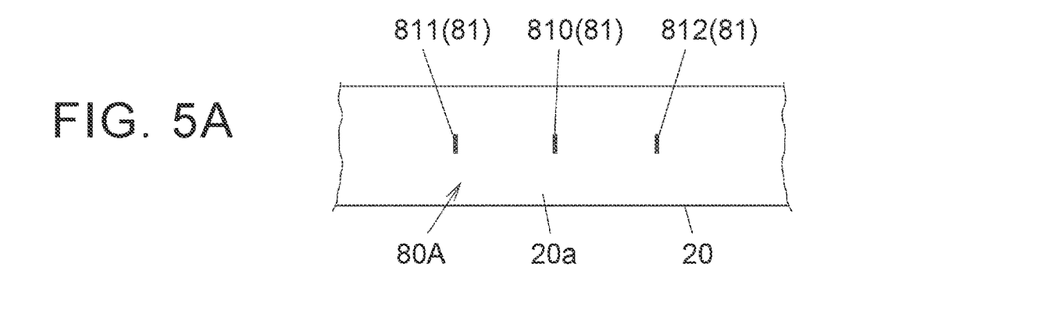
FIG. 5A is an explanatory diagram showing a read portion according to a first modification.

FIG. 5A is an explanatory diagram showing a read portion 80A according to a first modification. The read portion 80A is formed by removing the tick marks 813 from the read portion 80 according to the first embodiment. That is, the read portion 80A includes the neutral position mark 810 and the first and second rack end position marks 811, 812.

With the read portion 80A according to the first modification, the neutral position mark 810 can also accurately detect the neutral position of the rack shaft 20. Further, the rack end positions of the rack shaft 20 can be accurately detected with the first and second rack end position marks 811, 812. The axial position of the rack shaft 20 between the neutral position and the rack end positions can be detected based on changes in the detection signals from the rotation angle detection devices 212, 222 of the first and second electric motors 21, 22 with respect to the signals at the time when the neutral position or the rack end position has been detected.

Note that the first and second rack end position marks 811, 812 may be further omitted from the read portion 80A. Also in this case, the neutral position of the rack shaft 20 can be accurately detected, so it is possible to suppress a decrease in the straight line vehicle stability due to estimation errors of the steered angles of the front wheels 6L, 6R.

Figure 5B:
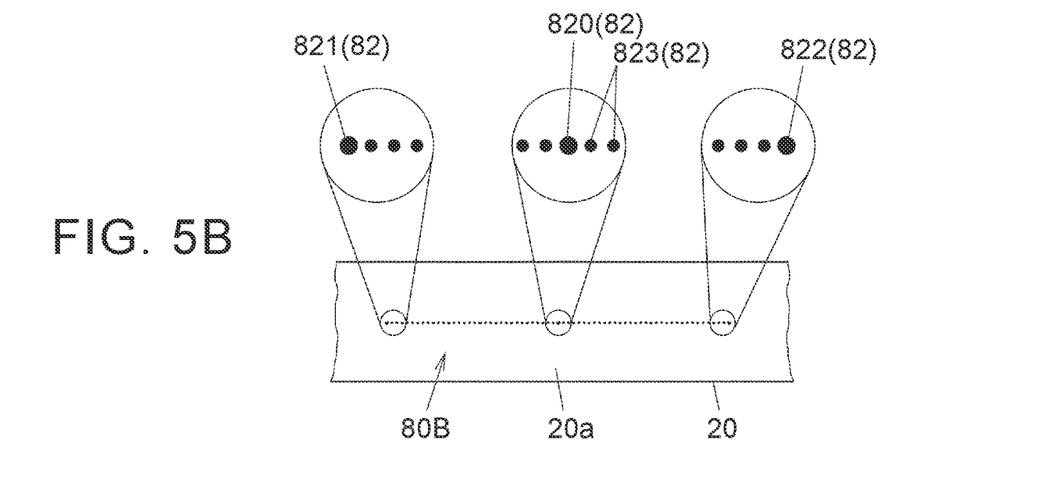
FIG. 5B is an explanatory diagram showing a read portion according to a second modification.

FIG. 5B is an explanatory diagram showing a read portion 80B according to a second modification. The read portion 80B is formed by replacing the marks 81 in the read portion 80 according to the first embodiment with a plurality of dot marks 82. The marks 82 include a neutral position mark 820, first and second rack end position marks 821, 822, and a plurality of tick marks 823.

With the read portion 80B according to the second modification, the same effects can be obtained as in the case where the read portion 80 according to the first embodiment is used. In the read portion 80B, the tick marks 823 alone, or the tick marks 823 and the first and second rack end position marks 821, 822 may be omitted.

Figure 5C:
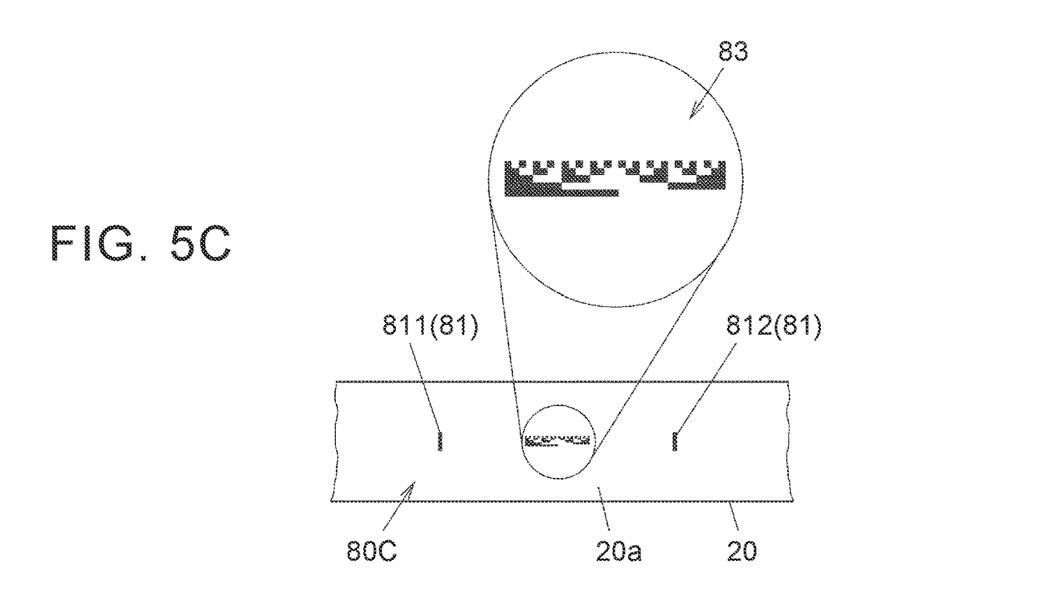
FIG. 5C is an explanatory diagram showing a read portion according to a third modification.

FIG. 5C is an explanatory diagram showing a read portion 80C according to a third modification. The read portion 80C is configured such that the position detection sensor 8 can detect an absolute position of the rack shaft 20 within a predetermined range around the neutral position. The read portion 80C is formed by removing the tick marks 813 from the read portion 80 according to the first embodiment and replacing the neutral position mark 810 with a code image 83 including code information that indicates the absolute position of the rack shaft 20 around the neutral position. Here, the absolute position is not a relative position representing, for example, how much the rack shaft 20 has moved since the previous operation of reading the marks 81, but is a position that allows a displacement amount (absolute displacement) of the rack shaft 20 from the neutral position with respect to the housing 5 to be specified.

The code image 83 has a belt shape extending in the right-left direction on the outer peripheral surface 20a of the rack shaft 20. The code image 83 includes binary information in which colored portions (black portions in FIG. 5C) and uncolored portions (white portions in FIG. 5C) each indicate 1-bit information (0/1), as seen in the circumferential direction of the rack shaft 20 corresponding to the vertical direction in FIG. 5C, that is, the code image 83 includes a code pattern of an absolute position encoder. The code image 83 indicates the absolute position of the rack shaft 20 with the code pattern. The position detection sensor 8 can detect the absolute position of the rack shaft 20 around the neutral position by scanning the code image 83 in the circumferential direction of the rack shaft 20.

With the read portion 80C according to the third modification, the absolute position of the rack shaft 20 in the axial direction can be accurately detected even in a vicinity of the neutral position. Note that the code image 83 may be provided corresponding to the entirety from one rack end position to the other rack end position. In this case, the absolute position of the rack shaft 20 in the axial direction can be accurately detected over the entire movement range of the rack shaft 20.

Second Embodiment

Next, a second embodiment of the disclosure will be described with reference to FIGS. 6A to 6C. The present embodiment is different from the first embodiment in that a rotary shaft 90 is supported by the housing 5 so as to rotate with movement of the rack shaft 20 in the axial direction and a position detection sensor 9 attached to the housing 5 for detecting the axial position of the rack shaft 20 detects a rotation angle of the rotary shaft 90.

Figure 6A:
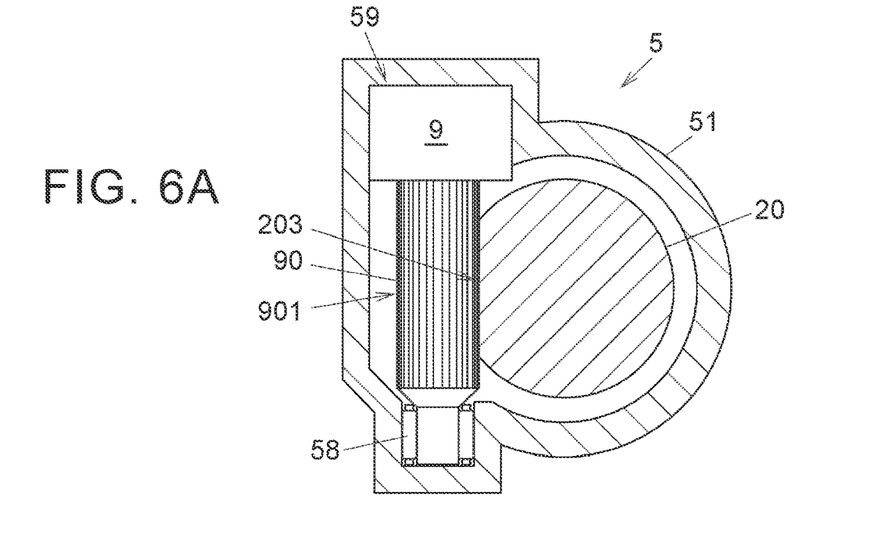
FIG. 6A is a sectional view showing a position detection sensor and a rotary shaft according to a second embodiment of the disclosure.
Figure 6B:
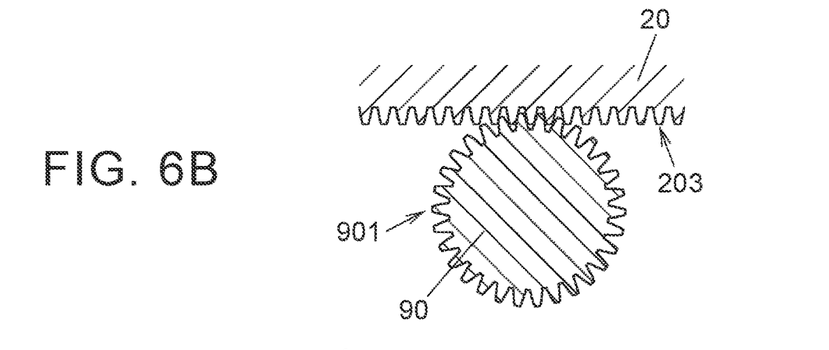
FIG. 6B is a sectional view showing a meshing portion between the rotary shaft and the rack shaft.

FIG. 6A is a sectional view showing the position detection sensor 9 and the rotary shaft 90 according to the second embodiment of the disclosure. FIG. 6B is a sectional view showing a meshing portion between the rotary shaft 90 and the rack shaft 20. FIG. 6C is a configuration diagram showing a configuration example of the position detection sensor 9.

The rotary shaft 90 has a first end portion in the axial direction held by the position detection sensor 9 and a second end portion in the axial direction supported by the first housing member 51 of the housing 5 via a bearing 58. The position detection sensor 9 is housed in an accommodating portion 59 provided in the first housing member 51. The rotary shaft 90 has pinion teeth 901 on its outer peripheral surface, and the pinion teeth 901 mesh with rack teeth 203 of the rack shaft 20.

Figure 6C:
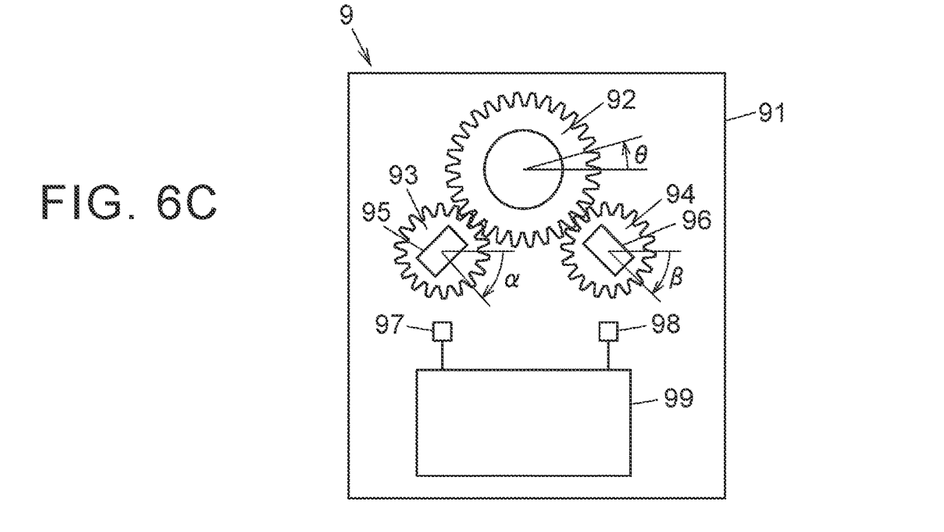
FIG. 6C is a configuration diagram showing a configuration of the position detection sensor.

As shown in FIG. 6C, the position detection sensor 9 includes a sensor case 91, a driving gear 92, first and second driven gears 93, 94, first and second permanent magnets 95, 96, first and second magnetic sensors 97, 98, and a signal processing unit 99. The sensor case 91 is held by the accommodating portion 59. The driving gear 92 rotates integrally with the rotary shaft 90. The first and second driven gears 93, 94 mesh with the driving gear 92 to rotate. The first and second permanent magnets 95, 96 each have a rod shape and are attached to the first and second driven gears 93, 94, respectively. The first and second magnetic sensors 97, 98 detect magnetic fields of the first and second permanent magnets 95, 96, respectively.

The first and second driven gears 93, 94 have different numbers of teeth, and a rotation angle $\alpha$ of the first driven gear 93 and a rotation angle $\beta$ of the second driven gear 94 when the driving gear 92 rotates by an angle $\theta$ are different from each other. The numbers of teeth of the first and second driven gears 93, 94 are set so that the least common multiple becomes a large value and the rotation angle $\alpha$ and the rotation angle $\theta$ do not become the same even when the rack shaft 20 moves from one rack end position to the other rack end position.

The signal processing unit 99 receives inputs of detection signals from the first and second magnetic sensors 97, 98, and detects the rotation angle of the rotary shaft 90 based on the detected directions and strengths of the magnetic fields. The signal processing unit 99 outputs a signal indicating the rotation angle of the rotary shaft 90 to the control device 10. The absolute position of the rack shaft 20 in the axial direction is indicated by the rotation angle of the rotary shaft 90. Note that the control device 10 may have a signal processing function of the signal processing unit 99. In this case, the detection signals of the first and second magnetic sensors 97, 98 are input to the control device 10.

According to the second embodiment, the same operation and effects as those of the first embodiment can be obtained, and the absolute position of the rack shaft 20 in the axial direction can always be detected.

APPENDIX

The disclosure has been described based on the first embodiment, modifications of the first embodiment, and the second embodiment. However, these embodiments and modifications are not intended to limit the disclosure according to the claims. It should be noted that all combinations of the features described in the embodiments are not essential for means for solving the problem according to the disclosure.

The embodiments may be appropriately modified to be carried out within the scope of the disclosure. For example, in the above-described embodiments, the case has been described in which the disclosure is applied to the steer-by-wire steering system 1 in which the right and left front wheels 6R, 6L are steered with the operation of the steering wheel 11 operated by the driver. However, the disclosure is not limited to this. For example, the steering system of the disclosure can be applied to an autonomous driving vehicle having no steering wheel 11.

In the first embodiment, the case has been described in which the position detection sensor 8 emits the reading light and receives the reflection light reflected by the read portion 80 to read the marks 81. However, a position detection sensor that reads marks of a read portion through magnetic means may be used. In this case, the read portion is composed of, for example, a magnetic tape in which position tick marks are magnetically recorded, and the position detection sensor is composed of a magnetic head.

What is claimed is:

1. A steering system comprising:
   a housing having a hollow shape;
   a steering operation shaft housed in the housing, the steering operation shaft having a first external thread groove that is one of a left-hand thread groove and a right-hand thread groove, the steering operation shaft having a second external thread groove that is the other one of the left-hand thread groove and the right-hand thread groove, and the steering operation shaft configured to move in an axial direction of the steering operation shaft to steer right and left steered wheels;
   a first nut screwed with the first external thread groove and rotatably supported inside the housing;
   a second nut screwed with the second external thread groove and rotatably supported inside the housing;
   a first drive source that generates a first drive force;
   a second drive source that operates independently of the first drive source to generate a second drive force;
   a first power transfer unit that transfers the first drive force to the first nut and rotates the first nut to apply an axial force to the steering operation shaft;
   a second power transfer unit that transfers the second drive force to the second nut and rotates the second nut to apply an axial force to the steering operation shaft;
   a position detection sensor that is provided in the housing and that detects an axial position of the steering operation shaft; and
   a control device that controls the first drive source and the second drive source using a detection result of the position detection sensor, wherein:
   the outer periphery of the steering operation shaft has a mark at positions where the first external thread groove and the second external thread groove are not provided,
   the position detection sensor detects the axial position of the steering operation shaft by using the mark, and
   the position detection sensor is fixed at a position at which the position detection sensor faces the mark.

2. The steering system according to claim 1, wherein the position detection sensor reads the mark on the steering operation shaft to detect the axial position of the steering operation shaft.

3. The steering system according to claim 2, wherein the position detection sensor reads the mark to detect a neutral position of the steering operation shaft.

4. The steering system according to claim 3, wherein the position detection sensor detects an absolute position of the steering operation shaft at least in a predetermined range around the neutral position.

5. The steering system according to claim 2, wherein the mark is a code image including code information indicating a position.

6. The steering system according to claim 1, wherein the first drive source and the second drive source are configured to transfer the first drive force and the second drive force to the steering operation shaft via the first power transfer unit and the second power transfer unit so as to cooperatively move the steering operation shaft.

7. A steering system comprising:
a housing having a hollow shape;
a steering operation shaft housed in the housing, the steering operation shaft having a first external thread groove that is one of a left-hand thread groove and a right-hand thread groove, the steering operation shaft having a second external thread groove that is the other one of the left-hand thread groove and the right-hand thread groove, and the steering operation shaft configured to move in an axial direction of the steering operation shaft to steer right and left steered wheels;
a first nut screwed with the first external thread groove and rotatably supported inside the housing;
a second nut screwed with the second external thread groove and rotatably supported inside the housing;
a first drive source that generates a first drive force;
a second drive source that operates independently of the first drive source to generate a second drive force;
a first power transfer unit that transfers the first drive force to the first nut and rotates the first nut to apply an axial force to the steering operation shaft;
a second power transfer unit that transfers the second drive force to the second nut and rotates the second nut to apply an axial force to the steering operation shaft;
a position detection sensor that is provided in the housing and that detects an axial position of the steering operation shaft;
a control device that controls the first drive source and the second drive source using a detection result of the position detection sensor;
a rotary shaft that is supported by the housing and that rotates with movement of the steering operation shaft in the axial direction, wherein an outer periphery of the rotary shaft has pinion teeth that mesh with rack teeth, and
the position detection sensor detects a rotation angle of the rotary shaft.

8. The steering system according to claim 7, wherein the first drive source and the second drive source are configured to transfer the first drive force and the second drive force to the steering operation shaft via the first power transfer unit and the second power transfer unit so as to cooperatively move the steering operation shaft.

* * * * *